United States Patent
Brandau et al.

(10) Patent No.: US 9,024,495 B2
(45) Date of Patent: May 5, 2015

(54) ROTOR

(75) Inventors: Rüdiger Brandau, Alheim (DE); Kurt Siebald, Rotenburg (DE)

(73) Assignee: Continental Automotive GmbH, Hannover (DE)

( * ) Notice: Subject to any disclaimer, the term of this patent is extended or adjusted under 35 U.S.C. 154(b) by 276 days.

(21) Appl. No.: 13/640,288

(22) PCT Filed: Apr. 7, 2011

(86) PCT No.: PCT/EP2011/055389
§ 371 (c)(1),
(2), (4) Date: Oct. 9, 2012

(87) PCT Pub. No.: WO2011/124629
PCT Pub. Date: Oct. 13, 2011

(65) Prior Publication Data
US 2013/0026862 A1  Jan. 31, 2013

(30) Foreign Application Priority Data

Apr. 9, 2010  (DE) .......................... 10 2010 014 597

(51) Int. Cl.
*H02K 21/12*  (2006.01)
*H02K 1/27*  (2006.01)
*H02K 15/03*  (2006.01)

(52) U.S. Cl.
CPC ............... *H02K 1/278* (2013.01); *H02K 15/03* (2013.01)

(58) Field of Classification Search
CPC ........ H02K 1/278; H02K 15/03; H02K 5/128

USPC ..................... 310/43, 156.08, 156.23, 156.28
See application file for complete search history.

(56) References Cited

U.S. PATENT DOCUMENTS

| | | | |
|---|---|---|---|
| 4,910,861 A | | 3/1990 | Dohogne |
| 5,040,286 A | | 8/1991 | Stark |
| 5,121,020 A | | 6/1992 | Bertram et al. |
| 5,140,210 A | * | 8/1992 | Shirakawa ............... 310/156.28 |
| 6,750,580 B2 | * | 6/2004 | Lai et al. .................. 310/156.28 |
| 7,612,478 B2 | * | 11/2009 | Marioni ................... 310/156.28 |
| 8,146,234 B2 | * | 4/2012 | Marioni .......................... 29/598 |
| 8,575,805 B2 | * | 11/2013 | Su ............................. 310/156.08 |
| 8,779,638 B2 | * | 7/2014 | Burton et al. .................... 310/43 |
| 2007/0114867 A1 | | 5/2007 | Marioni |
| 2007/0138891 A1 | * | 6/2007 | Hurst ....................... 310/156.28 |
| 2012/0074807 A1 | * | 3/2012 | Burton et al. ............ 310/156.28 |

FOREIGN PATENT DOCUMENTS

CN     1220038    6/1999
DE     84 27 703 U1  1/1986

(Continued)

*Primary Examiner* — Thanh Lam
(74) *Attorney, Agent, or Firm* — Cozen O'Connor

(57) ABSTRACT

A rotor for an electric motor that includes a main body on which a support surface is formed, to which a permanent magnet element is attached. The main body is partially surrounded by a joining sleeve having chamber walls. The chamber walls together with the support surfaces form a chamber in which the permanent magnet element is arranged. The joining sleeve fixes the position of the permanent magnet element in a radial direction on the main body and a locking element is molded onto the main body. The locking element closes the chamber fixing the position of the permanent magnet element in the axial direction on the main body.

3 Claims, 4 Drawing Sheets

(56) References Cited

FOREIGN PATENT DOCUMENTS

| | | |
|---|---|---|
| DE | 38 07 810 C1 | 9/1989 |
| DE | 10 2004 060 379 | 6/2006 |
| DE | 10 2004 060 379 A1 | 6/2006 |
| DE | 10 2005 052 870 | 5/2007 |
| DE | 10 2005 052 870 A1 | 5/2007 |
| EP | 1 209 799 | 5/2002 |
| EP | 1 209 799 A2 | 5/2002 |
| EP | 1 788 690 | 5/2007 |
| EP | 1 788 690 A1 | 5/2007 |
| EP | 1 209 799 B1 | 7/2007 |
| FR | 2 604 312 A1 | 3/1988 |
| JP | 2001-516550 | 9/2001 |
| WO | WO 97/45917 A1 | 12/1997 |

* cited by examiner

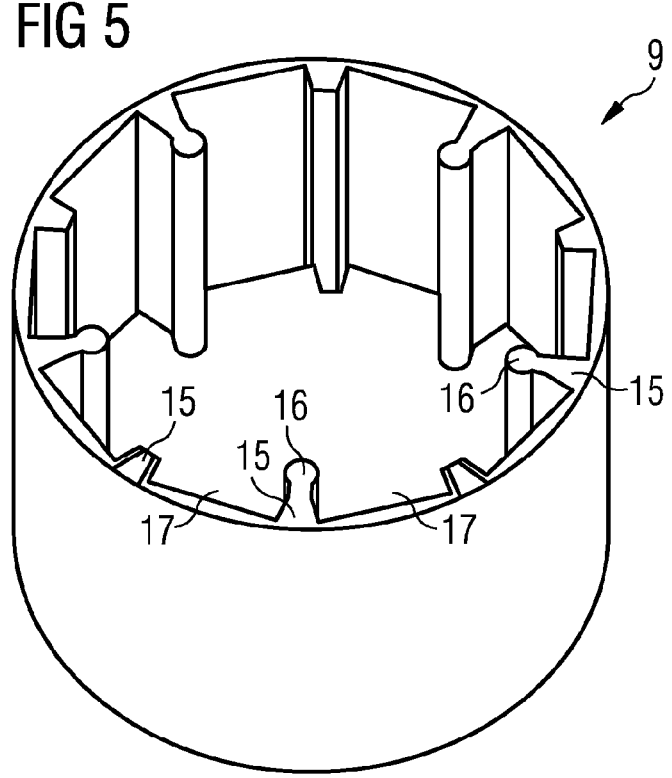
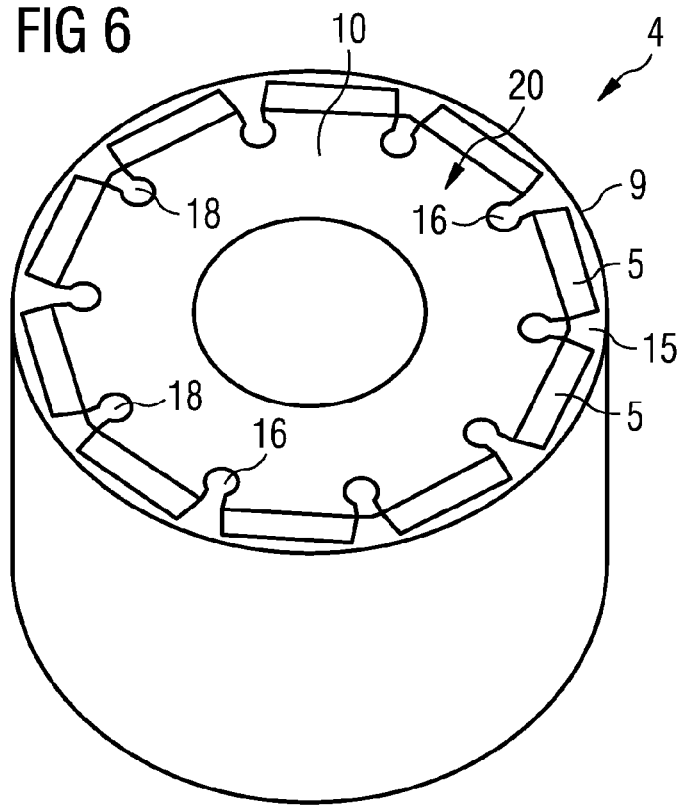

ROTOR

CROSS REFERENCE TO RELATED APPLICATIONS

This is a U.S. national stage of application No. PCT/EP2011/055389, filed on 7 Apr. 2011. Priority is claimed on German Application No. 10 2010 014 597.1 filed 9 Apr. 2010, the content of which is incorporated here by reference.

BACKGROUND OF THE INVENTION

1. Field of the Invention

The invention relates to a rotor for an electric motor, the rotor having a basic body on which is formed at least one bearing surface, to which at least one permanent-magnetic element is attached. The invention relates, furthermore, to a method for producing a rotor for an electric motor.

2. Description of the Prior Art

Rotors for electric motors of the type initially mentioned are known and are used in many different ways. There are different methods for fastening the permanent-magnetic elements to the basic body of the rotor. It is known, for example from DE 10 2005 052 870 A1, to inject a plastic completely around the permanent-magnetic elements and thus fix them to the basic body. In this case, however, it is very difficult to hold the permanent-magnetic elements exactly in position during the injection molding operation. Since, in injection molding, the injection material is injected at very high pressure, the permanent-magnetic elements may be shifted in position on the basic body during the injection molding. The permanent-magnetic elements may also be glued to the basic body. This, however, is a very difficult and therefore costly process which also often leads to insufficient results.

SUMMARY OF THE INVENTION

An object of one embodiment of the present invention is to specify a rotor for an electric motor, in which the at least one permanent-magnetic element is fastened to the basic body cost-effectively and in an exactly predetermined position.

Since the basic body is surrounded partially by a joining sleeve which has chamber walls, the chamber walls forming with the bearing surfaces at least one chamber in which the at least one permanent-magnetic element is arranged, the at least one permanent-magnetic element is held very exactly in position on the bearing surfaces. This gives rise to a very well-balanced rotor which has no unbalance, even when running at high speed, and therefore subjects the rotor bearing to only slight load. This contributes considerably to a long service life of the electric motor. Since the joining sleeve fixes the permanent-magnetic element in position on the basic body in the radial direction, a shift of the permanent-magnetic element during injection molding and also after the production of the rotor is prevented in the radial direction. Since a locking element is injection-molded onto the basic body and closes the chamber and consequently fixes the permanent-magnetic element in position on the rotor in the axial direction, a high-quality rotor for an electric motor can be produced cost-effectively.

In one embodiment, the basic body has formed on it at least one channel which extends in the axial direction over the entire basic body that separates two bearing surfaces from one another, a chamber wall of the joining sleeve engaging into the channel. The engagement of the chamber wall into the channel advantageously secures the joining sleeve against twisting on the basic body.

If the channel has an undercut and an anchor element is formed on the chamber wall, the anchor element engages positively into the undercut a highly resistant and positionally stable securing of the joining sleeve to the basic body is ensured.

Since the basic body has formed on it a multiplicity of channels that separate a multiplicity of bearing surfaces from one another, and the joining sleeve has formed on it a corresponding multiplicity of chamber walls, every second one of which has an anchor element which engages positively into the undercut of an assigned channel, on the one hand, highly stable fixing of the joining sleeve and therefore of the permanent-magnetic elements on the basic body is achieved and, on the other hand, incompletely filled channels in the basic body remain, through which some of the mass of injection material can pass when the locking element is being injection-molded, with the result that the locking element can be formed on both end faces of the basic body, even if the mass of injection material is injection-molded onto only one end face. During injection molding, the liquid mass of injection material is pressed from the injection-molded end face of the basic body through the incompletely filled channels in the basic body onto the side lying opposite the injection-molded side of the basic body. In this case, the channels incompletely filled before injection molding are also filled completely with the mass of injection material.

In one embodiment, the basic body comprises a magnetically conductive material. For example, ferrometallic materials are suitable for this purpose, but materials comprising plastic-bound ferrometallic particles may also be used. The basic body comprising magnetically conductive material increases the efficiency of the electric motor and therefore also its performance. It is especially advantageous if the basic body is a bundle of punched sheet-metal parts.

The object is achieved, moreover, by a method for producing a rotor for an electric motor, the rotor having a basic body on which is formed at least one bearing surface. At least one permanent-magnetic element is attached to the bearing surface and is held solely by a holding tool, after which a joining sleeve with chamber walls is pushed on in the axial direction over the basic body and the permanent-magnetic element. The permanent-magnetic element is therefore then held by the joining sleeve and the holding tool can be removed. This ensures that the permanent-magnetic element is fixed to the basic body sufficiently in the radial direction by the joining sleeve and the bearing surface. The joining sleeve is then pushed completely over the permanent-magnetic element and a locking element is injection-molded onto the basic body by the injection molding method. The locking element causes the permanent-magnetic element to be fixed to the basic body in the axial direction. The method disclosed here is very simple and cost-effective, since complicated processes, such as gluing or welding, can be dispensed with entirely. The joining sleeve can be produced in a separate injection molding process, before the mounting of the rotor, in a highly cost-effective way and with high accuracy. The method presented here for producing a rotor is suitable especially for the fully automatic production of the rotor. This saves production costs and minimizes the error rate.

Furthermore, the object is achieved by a method for producing a rotor for an electric motor, the rotor having a basic body on which is formed at least one bearing surface. Here, a joining sleeve with chamber walls is pushed on in the axial direction over the basic body, so that the bearing surface and the chamber walls form at least one chamber. A permanent-magnetic element is then pushed into this chamber in the axial direction, so that the permanent-magnetic element is fixed to the basic body sufficiently in the radial direction by the joining sleeve and the bearing surface. A locking element is then injection-molded onto the basic body causing the permanent-magnetic element to be fixed to the basic body in the axial direction. Even the holding tools for the permanent-magnetic elements may be dispensed with in this method. This method for producing a rotor is also especially suitable for the fully automatic production of the rotor.

BRIEF DESCRIPTION OF THE DRAWINGS

The invention is explained in more detail below by the figures in which:
FIG. 5 is the joining sleeve;
FIG. 6 is the rotor with the metallic basic body.

DETAILED DESCRIPTION OF THE PREFERRED EMBODIMENTS

Figure 1:
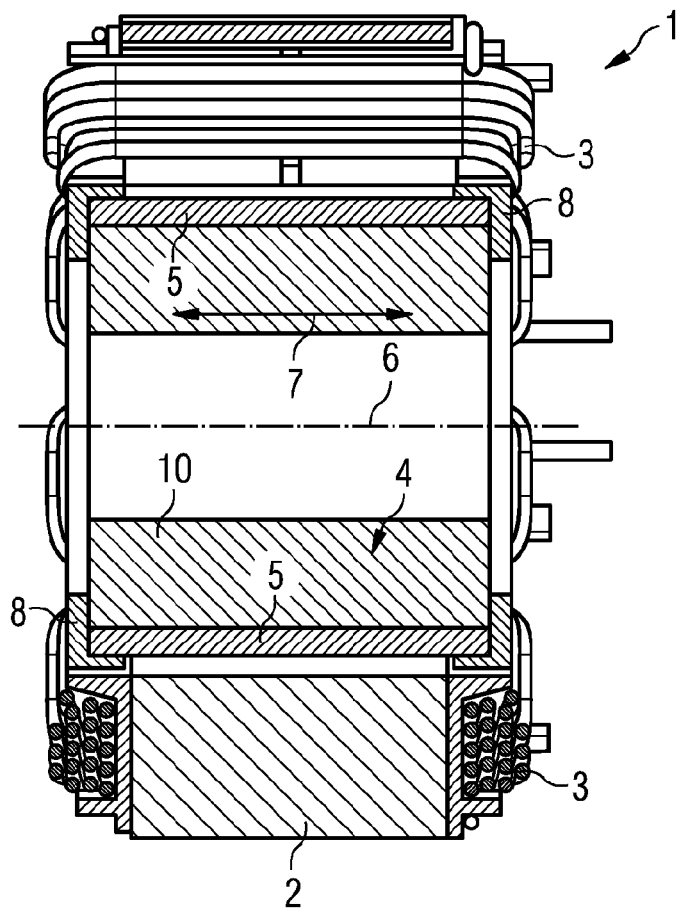
FIG. 1 is an electric motor.
Figure 2:
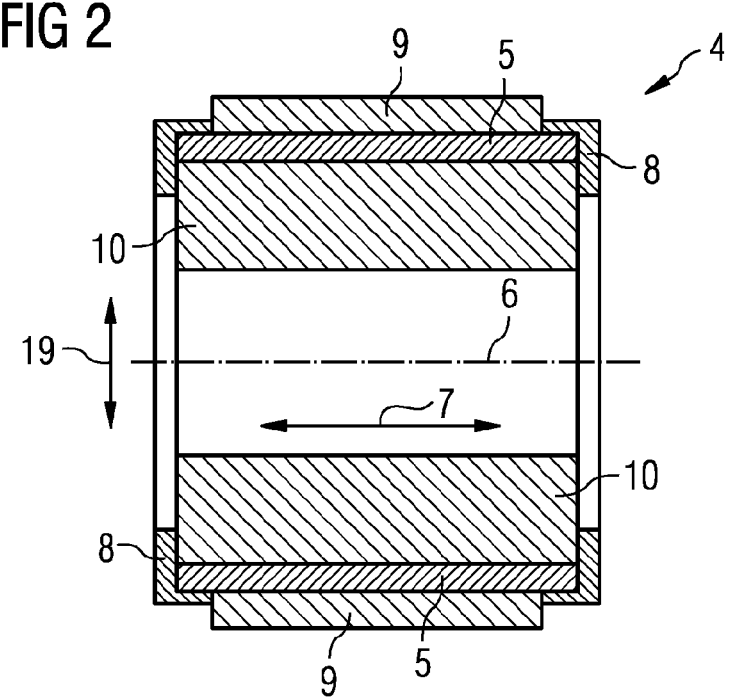
FIG. 2 is a set-up of the rotor.

FIG. 1 shows an electric motor 1 with a stator 2 and with a rotor 4. Electric motor 1 may be a reluctance motor, as it is known. Coils 3 are attached to the stator 2 and can be subjected to a commutated electrical current whereby a magnetic alternating field can be generated. The rotor 4 is mounted rotatably on an axis 6 and has a basic body 10 and permanent-magnetic elements 5. These permanent-magnetic elements 5 are held on the basic body 10 by a joining sleeve 9 and a locking element 8 (FIG. 2). The arrow indicates the axial direction 7 in which, for example, the joining sleeve 9 can be pushed onto the basic body 10. The permanent-magnetic elements 5 are of parallelepipedal form, this being especially cost-effective. However, they may also be of shell-shaped form.

The set-up of the rotor 4 is illustrated in more detail in FIG. 2. A multiplicity of permanent-magnetic elements 5, which are arranged on the cylindrical outer surface of the basic body 10, are shown. The permanent-magnetic elements 5 are of parallelepipedal form. The permanent-magnetic elements 5 attached to the basic body 10 are fixed in the radial direction 19 by the joining sleeve 9 and are fixed in the axial direction by the locking element 8. Furthermore, the axis of rotation 6, about which the rotor 4 rotates when it is installed in the electric motor 1, can be seen.

Figure 3:
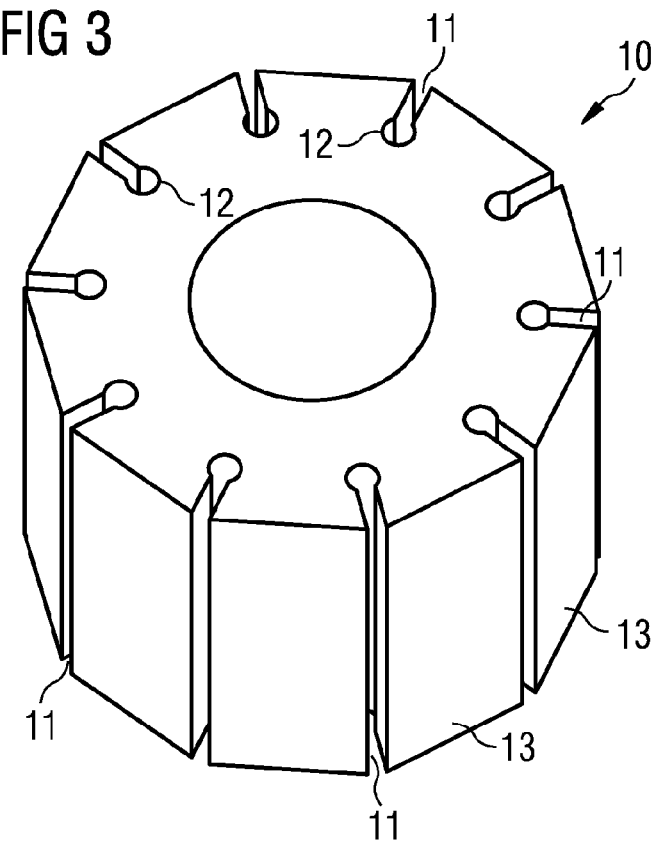
FIG. 3 is the basic body.

FIG. 3 shows the basic body 10, which may be formed from ferrometallic material. It is especially advantageous if the basic body 10 is formed from a punched sheet-metal bundle. Furthermore, it is conceivable to form the basic body from a plastic to which ferromagnetic particles are admixed. The basic body 10 has formed on it channels 11, which extend in the axial direction 7 over the entire basic body 10. A channel 11 separates two bearing surfaces 13 from one another. The channels 11 have undercuts 12. The basic body 10 shown here must, to complete the rotor 4, be equipped with permanent-magnetic elements 5, which are fixed on the bearing surfaces 13. For this purpose, the permanent-magnetic elements 5 can be laid onto the basic body 10 during the manufacturing process as already magnetized permanent-magnetic elements 5 or as non-magnetized permanent-magnetic elements 5. In the case of permanent-magnetic elements 5 which are not yet magnetized, the magnetization of the permanent-magnetic elements 5 takes place after the completion of the rotor 4.

Figure 4:
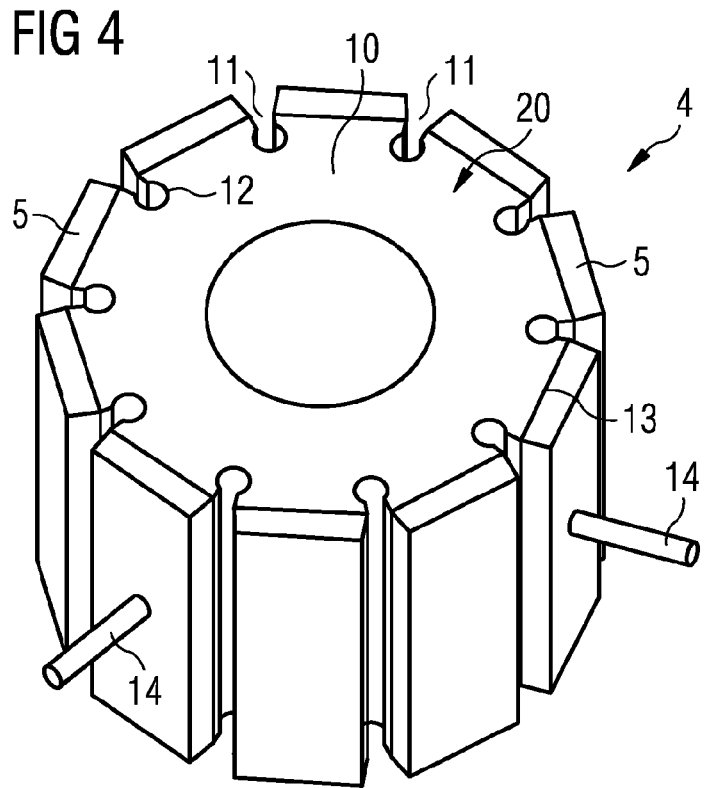
FIG. 4 are channels and undercuts on the basic body.

FIG. 4 shows the basic body 10 with permanent-magnetic elements 5 laid onto the bearing surfaces 13. The permanent-magnetic elements 5 are in this example held in position on the bearing surfaces 13 by holding tools 14 until the joining sleeve 9 is guided at least partially over the basic body 10 and the permanent-magnetic elements 5.

The channels 11 and the undercuts 12 in the basic body 10 can be seen in FIG. 4. Furthermore, one end face 20 of the basic body 10 is illustrated here. The joining sleeve 9 illustrated in FIG. 5 can then be pushed on in the axial direction 7 over the configuration in FIG. 4. In this case, the anchor elements 16 on the joining sleeve 9 engage positively into the undercuts 12 on the basic body 10.

FIG. 5 shows the joining sleeve 9. The joining sleeve 9 can be produced as a separate component, for example, by injection molding before the rotor is mounted. It can be seen in FIG. 5 that an anchor element 16 is formed on only every second chamber wall 5 of the joining sleeve 9. Since the same number of channels 11 with undercuts 12 are formed on the basic body as there are chamber walls 15 available in the joining sleeve 9, but an anchor element 16 is formed on only every second chamber wall 15 of the joining sleeve 9, every second channel 18 in the basic body 10 remains partially unfilled when the joining sleeve 9 has been pushed onto the basic body 10. Furthermore, FIG. 5 shows the chambers 17 which are formed by the chamber walls 15 and into which the permanent-magnetic elements 5 seat when the joining sleeve 9 is being pushed onto the basic body 10 as illustrated in FIG. 6.

FIG. 6 shows the rotor 4 with the metallic basic body 10 and with the permanent-magnetic elements 5 which lie on the bearing surfaces 13, the joining sleeve 9 being pushed on over the permanent-magnetic elements 5 and the basic body 10. What can be seen is that only every second undercut 12 of the basic body 10 is filled with an anchor element 16 of the joining sleeve 9. The unfilled channels 18 and their undercuts 12 prove to be especially advantageous when the locking element 8 is being injection-molded. This is also illustrated later. It may be noted that, in addition to every second chamber wall, every n'th chamber wall may also be provided with an anchor element, whereby also only every n'th channel is then filled completely as far as the undercut when the joining sleeve 9 is pushed onto the basic body 10 (let n be a natural number, n=2, 3, 4, . . . ).

It may also be noted that the order in which the permanent-magnetic elements 5 are attached to the bearing surfaces 13 may also vary. For this purpose, it is possible to push the joining sleeve 9 onto the basic body 10 from FIG. 3 and only then push the permanent-magnetic elements 5 into the chambers 17 thus obtained. In this procedure, it is even possible to avoid using holding tools 14. Moreover, any combination of the two procedures described may be envisaged. After the basic body 10 has been fitted with the permanent-magnetic elements 5 and the joining sleeve 9 is brought into its position over the basic body 10 and the permanent-magnetic elements 5, the locking element 8 is injection-molded in place. It is possible to introduce the structure according to FIG. 6 into an injection molding die and to inject a mass of injection material against the basic body 10 from only one end face 20 of the latter, the mass of injection material then flowing through the free regions of the channels 11 and the undercuts 12 onto the opposite end face 20 of the basic body 10, the locking element 8 being formed on both end faces 20 of the basic body 10, thus completely preventing the movement of the permanent-magnetic elements 5 in the axial direction 7 when the locking element is cured. Since, when the mass of injection material flows through the free regions of the channels 11, webs 21 are formed between the two regions of the locking element 8 which bear against the end faces 20, especially durable and long-lived fastening of the permanent-magnetic elements 5 on the basic body 10 is obtained.

Figure 7:
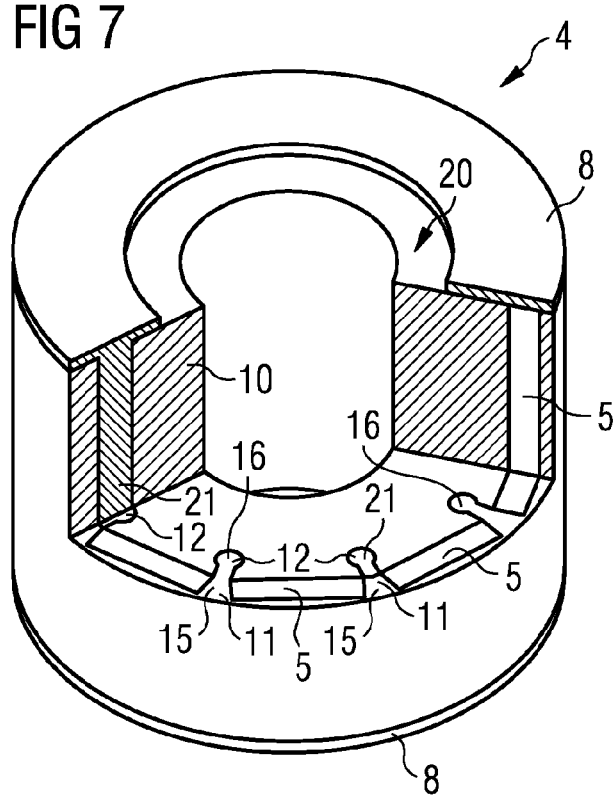
FIG. 7 is a segmental section through the rotor according to the invention.

A segmental section through the rotor 4 according to one embodiment of the invention produced in this way is shown in FIG. 7. The basic body 10 with an end face 20 can be seen once again. The channels 11 with the undercuts 12 can be seen on the basic body 10. Each channel 11 is filled at least partially by a chamber wall 15.

However, every second (or every n'th) channel 11 is only up to half-filled, the undercut 12 being left free. The chamber walls 15 engage positively with the anchor elements 16 into the completely filled channels 12. The mass of injection material of the locking element 8 has penetrated through the incompletely filled channels, particularly in the region of the undercuts 12, and it has been possible for the locking element to be formed both on the injection-molded and on the opposite end face 20 of the basic body 10. This upper and lower formation of the locking element 8 is connected by the webs 21. These webs 21 themselves fill the previously free channels 18 completely and positively. The rotor shown here is extremely cost-effective and it can be produced fully automatically but at the same time is extremely stable in the long term, and the rotor 4 illustrated here is extremely well-balanced on account of the highly accurate arrangement of the permanent-magnetic elements 5. This freedom of the rotor 4 from unbalance leads to an especially long service life of the electric motor 1 equipped with this rotor 4 according to the invention.

Figure 8:
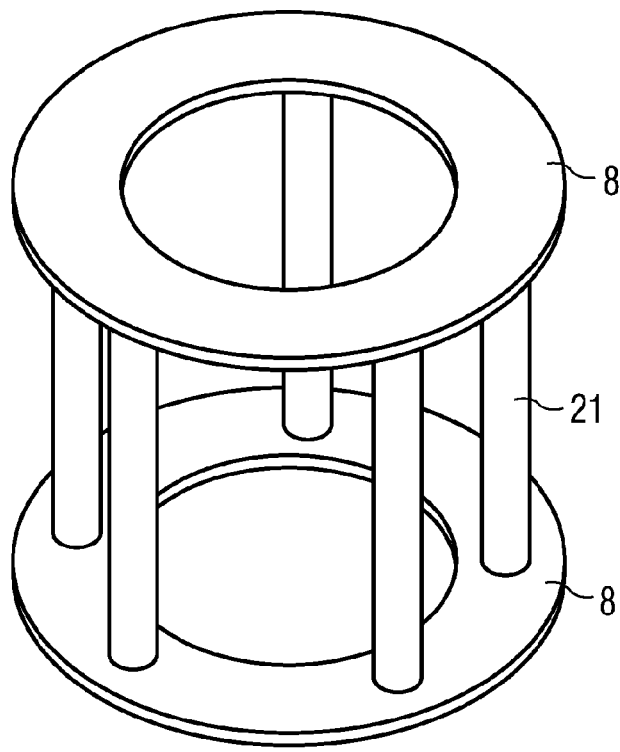
FIG. 8 is the locking element obtained as a result of the injection molding operation.

FIG. 8 illustrates individually the locking element obtained as a result of the injection molding operation. The basic body and the permanent-magnetic elements are not illustrated here. The locking element 8 has an upper and a lower ring which effectively prevent the axial shift of the permanent-magnetic elements 5. Furthermore, the webs 21 can be seen which have been formed between the two rings while the locking element 8 has been injection-molded on. The locking element 8 has preferably been injection-molded onto the basic body 10 from only one end face 20, but it is also conceivable to injection-mold the locking element 8 onto the basic body 10 from both end faces 20.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A rotor for an electric motor, comprising:
a basic body having a plurality of bearing surfaces;
a plurality of permanent-magnetic elements each attached to a respective one of the bearing surfaces of the basic body;
a joining sleeve having a plurality of chamber walls arranged to at least partially surround the basic body, the chamber walls and the bearing surfaces forming chambers in which respective ones of the permanent-magnetic elements are arranged, the joining sleeve fixing the permanent-magnetic elements in position on the basic body in a radial direction; and
a locking element injection-molded onto the basic body, the locking element closing the chambers and fixing the permanent-magnetic elements in position on the basic body in an axial direction,
wherein the basic body further comprises a plurality of channels that extend axially over the basic body and each separate two of the plurality of bearing surfaces from one another, the chamber walls of the joining sleeve being configured to engage respective ones of the plurality of channels,
wherein each of the plurality of channels has an undercut and at least one of the chamber walls has an anchor element formed thereon, each anchor element configured to positively engage in the undercut, and
wherein only every $n^{th}$ one of the plurality of chamber walls has a respective anchor element that positively engages in the undercut of a corresponding channel, where n is a natural number greater than 1.

2. The rotor as claimed in claim 1, wherein n=2.

3. The rotor as claimed in claim 1, wherein the basic body is a magnetically conductive material.

* * * * *